United States Patent [19]

Albo et al.

[11] 4,379,527

[45] Apr. 12, 1983

[54] SHUTTLE DRIVE ASSEMBLY

[75] Inventors: Ronald T. Albo, Los Gatos; James E. Carney, Jr., Santa Cruz; Robert E. Riehl, Sunnyvale, all of Calif.

[73] Assignee: Caterpillar Tractor Co., Peoria, Ill.

[21] Appl. No.: 130,490

[22] PCT Filed: Jan. 9, 1980

[86] PCT No.: PCT/US80/00020

§ 371 Date: Jan. 9, 1980

§ 102(e) Date: Jan. 9, 1980

[87] PCT Pub. No.: WO81/02000

PCT Pub. Date: Jul. 23, 1981

[51] Int. Cl.³ ............... B65H 81/04; B29H 17/02; H01F 41/08
[52] U.S. Cl. ................ 242/4 BE; 156/117; 156/397
[58] Field of Search ............ 242/4 R, 4 BE, 4 B; 156/117, 397

[56] References Cited

U.S. PATENT DOCUMENTS

| | | | |
|---|---|---|---|
| 1,361,945 | 12/1920 | Wheildon . | |
| 1,669,553 | 5/1928 | Derry . | |
| 3,383,059 | 5/1968 | Fahrbach | 242/4 B |
| 3,764,082 | 10/1973 | Gorman | 242/4 B |
| 3,864,188 | 2/1975 | Grawey et al. | 156/397 |
| 4,007,881 | 2/1977 | Haslau | 242/43 |

*Primary Examiner*—Billy S. Taylor
*Attorney, Agent, or Firm*—Wegner, Stellman, McCord, Wiles & Wood

[57] ABSTRACT

A shuttle driving assembly (10) including an open shuttle (22) rotatably driven on an automatically opened support frame (16) by a plurality of drive roller assemblies (85,87) carried by the frame (16). Each drive roller assembly (85,87) has a drive roller pulley (84) and at least one with plural belts (192,191,190,188,186) driving groups of the drive roller assemblies. The drive rollers contact a groove (115) on the shuttle (22) to provide a positive and responsive power transmission therebetween. The shaft (82) of each drive roller assembly (85,87) is mounted in a non-concentric bearing in a web (30) of the support frame (16) to provide adjustment of the position of the drive rollers (92) relative to the shuttle (22) for centering the shuttle (22) relative to the frame (16). A motor and brake set (18) is provided on a base (12) for driving the shuttle (22) through the drive roller assemblies (85,87) at a constant speed of rotation, and for rapidly accelerating, decelerating and braking the rotation of the shuttle (22). An entrance guide (116,117) is provided for the groove (115) of the drive track on the shuttle (22) to facilitate tracking the traverse of the shuttle (22) across an open segment (38) of the frame (16) between the last drive roller (92) preceding the traverse and the first drive roller (92) after the traverse.

17 Claims, 8 Drawing Figures

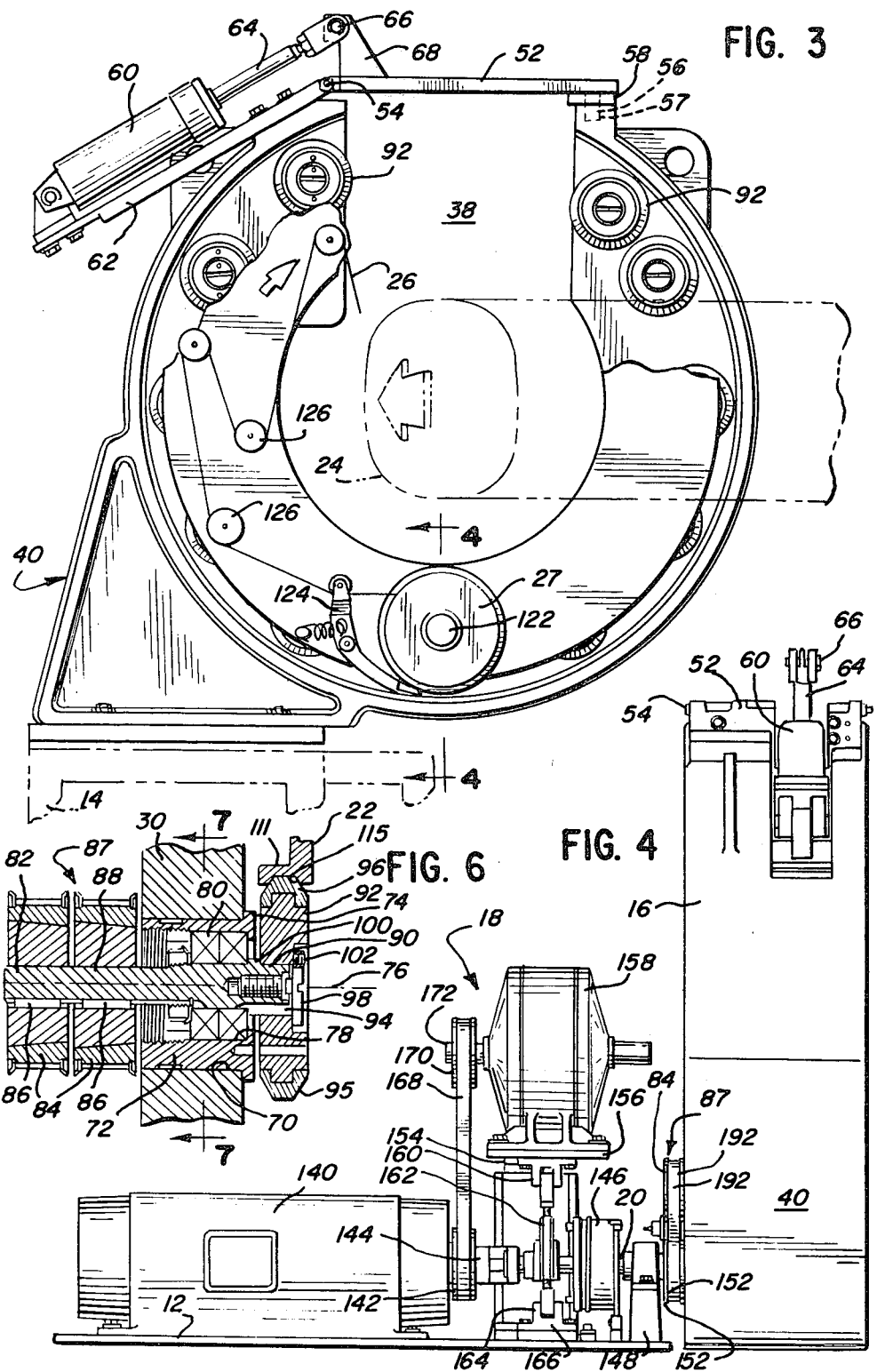

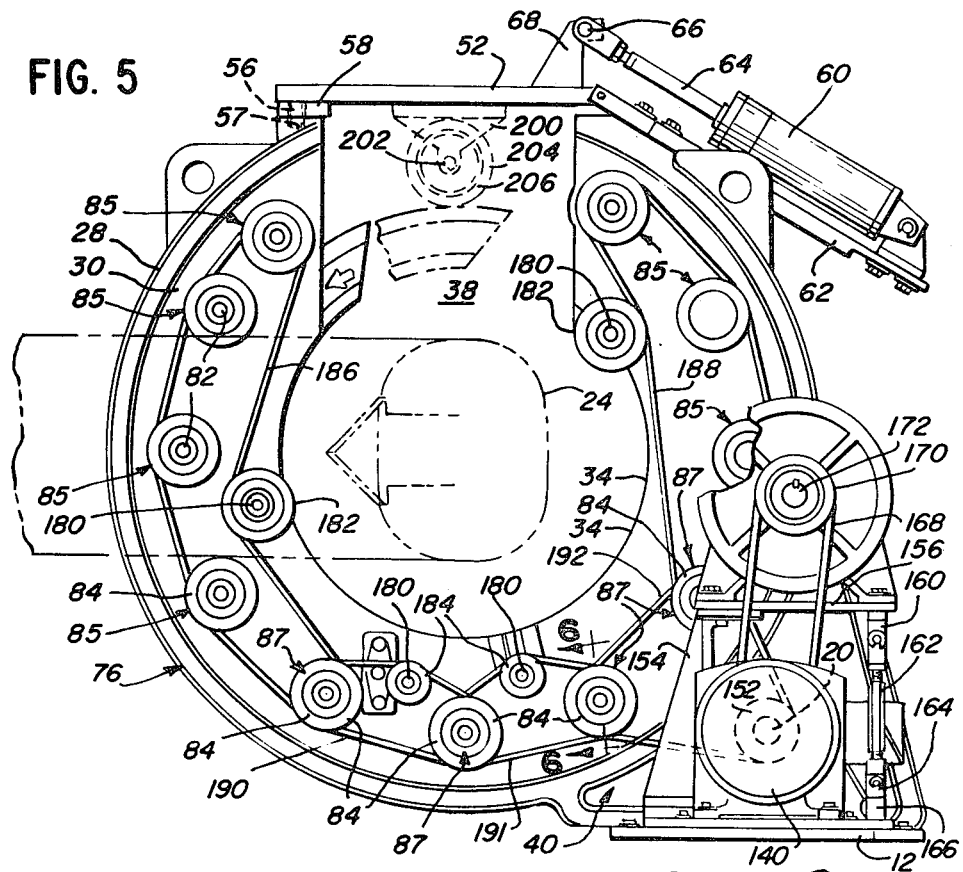
FIG. 5
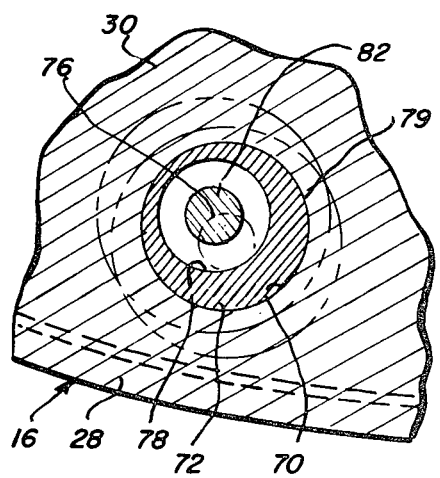
FIG. 7
FIG. 8

SHUTTLE DRIVE ASSEMBLY

DESCRIPTION

Technical Field

This invention relates to a toroidal body winding or wrapping apparatus and, more particularly, to an apparatus for driving an open shuttle on an open frame for winding or wrapping said body.

Background Art

Apparatus for winding and wrapping elongate material on a toroidal body using a rotating closed shuttle has been known for some time. The shuttle and support frame of the apparatus has to be manually disengaged and a segment of the shuttle and support frame has to be swung open so as to load a toroidal body in the opening therein. The segments of the shuttle and support frame are then swung shut and secured. The support frame has at least one drive sprocket engaging a gear on the outer periphery of the shuttle with idler rollers carried by the support frame engaging the periphery of the shuttle to guide the shuttle rotation about the axis of the support frame. The sprocket and gear drive has maximum rotational speed of about 100 rpm which limits the winding and wrapping speed accordingly. The idler rollers for the shuttle have eccentric shafts for radial adjustments of the shuttle relative to the support frame. Bearings were mounted in the roller portion of the idlers which make roller replacement very difficult.

The present invention is directed to overcoming one or more of the problems as set forth above.

Disclosure of Invention

A high speed assembly is provided for winding and wrapping toroidal bodies at increased speeds in a semiautomatic or fully automatic manner.

The assembly has a support frame with a C-shaped configuration including a cutaway segment permitting access into the opening in the midportion thereof. A rotating shuttle having a C-shaped configuration with a cutaway segment also permits access into the opening in the midportion thereof. The shuttle is juxtaposed on the support frame with a track or groove in the periphery of the shuttle in which is seated the drive rollers of a plurality of drive roller assemblies carried by the support frame. The drive roller assemblies have pulleys which are engaged by at least one of several drive belts. A motor and brake set drives, stabilizes and brakes the drive belts, pulleys and rollers so as to drive and to brake the shuttle about the center of the support frame.

A latch gate is pneumatically operated to open or close access to the cutaway segment into the open midportion of the support frame. When the gate is open and the cutaway segment of the shuttle is aligned with the cutaway segment of the support frame, a toroidal body can be loaded or unloaded into or from the aligned openings in the midportion thereof.

The shaft for each drive roller assembly passes through a non-concentric bearing sleeve seated in an aperture in the frame and each shaft is keyed to the pulley and to the roller for control and simplified replacement of worn rollers. The non-concentric sleeves are selectively rotatable in the apertures relative to the frame so as to position the rollers in such a way as to center the shuttle relative to the support frame.

The shuttle is rotated at relatively high speeds which necessitates balancing the shuttle as close to ideal as feasible considering the changing conditions to which the shuttle is subjected. The shuttle is balanced when the spool containing the material being wrapped or wound is empty so as to have a minimum effect when completing the wrapping or winding of a body.

BRIEF DESCRIPTION OF DRAWINGS

FIG. 3 is a front elevational view, with parts broken away, of the shuttle driving assembly of FIG. 1;

FIG. 4 is an end elevational view of the shuttle driving assembly;

FIG. 5 is a rear elevational view of the shuttle driving assembly;

FIG. 6 is an enlarged cross-sectional view taken on the line 6—6 of FIG. 5;

FIG. 7 is a cross-sectional view taken on the line 7—7 of FIG. 6; and

FIG. 8 is a partial perspective view of the last roll of the support frame before the cutaway segment and the end view of the track or groove on the shuttle as it passes said last roll.

BEST MODE FOR CARRYING OUT THE INVENTION

Figure 1:
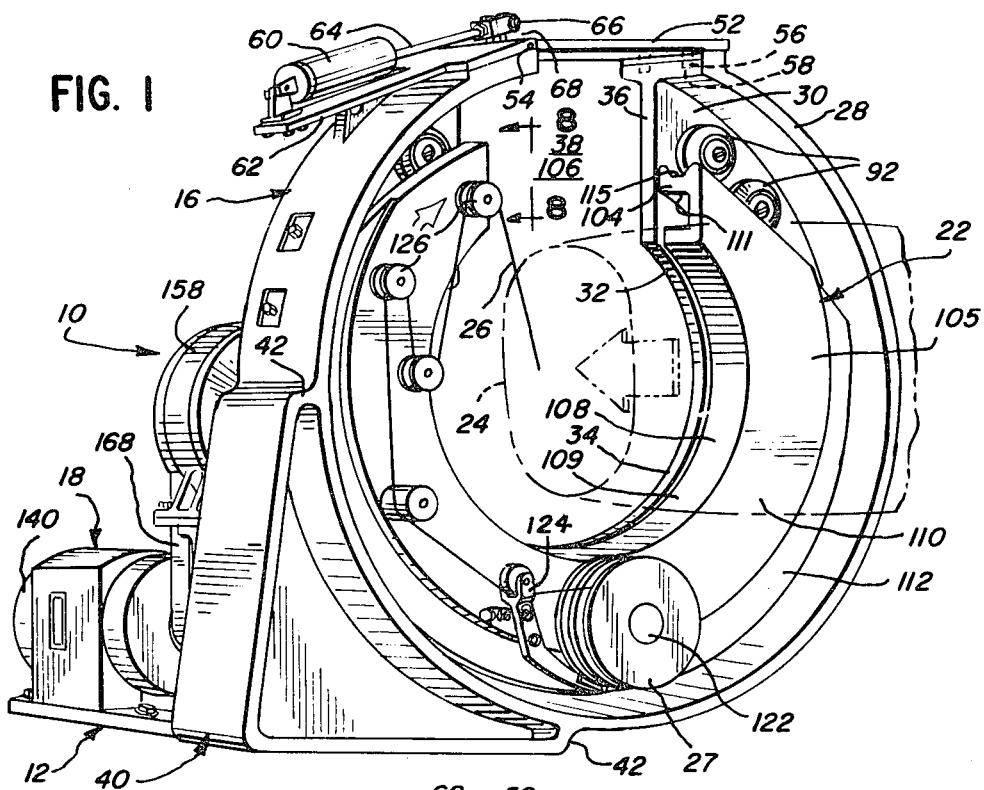
FIG. 1 is a perspective view of a shuttle driving assembly incorporating the invention therein.

Referring generally to FIGS. 1 and 4, the principal components of a shuttle driving mechanism or assembly 10 is illustrated and comprises a base 12 bolted to a table 14 (shown in phantom in FIG. 3) with a support frame 16 extending upwardly from the base 12 in a plane lying transverse to the plane of the base 12. A motor and brake set 18 is mounted on the base 12 and has an output 20 which either drives or stops the rotation of a shuttle 22 carried by the support frame 16. The motor and brake set 18 drives the shuttle 22 for rotation in a substantially vertical plane about a toroidal body 24 which is rotated in the mid-circumferential plane of the toroidal body 24. The mid-circumferential plane is shown substantially horizontal and is substantially perpendicular to the vertical plane of the shuttle 22 so that elongate material 26 carried on a spool 27 on the shuttle 22 is wound or wrapped on the toroidal body 24 under substantially uniform tension and in a uniform helical pattern.

The support frame 16 includes a cylindrical housing 28 having a radially, inwardly directed web 30 which has an inner wall 34 defining an article-receiving opening 32. Walls 36 define a segment cut out from the housing 28 and web 30 to define an entrance opening or passage 38 providing access into the article-receiving opening 32. The cylindrical housing 28 is supported on the base 12 with its axis lying substantially parallel to the horizontal plane of the base 12, by a triangularly-shaped support bracket 40 connected at junctions 42 to the housing 28.

A latching gate 52 is pivoted at 54 (FIG. 3) to one side of the entrance opening or passage 38 of the housing 28. Pins 56, shown in phantom in FIGS. 1 and 3, are carried by the outwardly extending end portion of the latching gate 52 and telescope into openings 57 in the flange 58 on the other side of said entrance opening or passage 38 of the housing 28 so as to close said entrance opening or passage 38 to the article-receiving opening 32 of the housing 28. An actuator 60 is supported on a platform 62 secured on the housing 28 so that a rod 64 of the actuator 60 is pivotally connected by pin 66 to a plate 68 carried by the latching gate 52. A signal from a preprogrammed computer, not shown, will activate the actuator 60 to open the latching gate 52 whereupon a toroidal body 24 may be loaded or unloaded from the article-receiving opening 32.

In FIGS. 2, 5, 6 and 7, a plurality of apertures 70 are formed through the web 30 in frame 16 (see FIGS. 6 and 7). In each aperture 70 is seated a non-concentric bearing sleeve 72 having a flange 74 (FIG. 6) seated against the one face of the web 30. The bearing sleeves 72 are rotatably adjustable in the apertures 70 so as to shift the center 76 of an aperture 78 formed through said bearing sleeve 72 which aperture 78 is non-concentric with the outer surface 79 of the bearing sleeve 72. The bearing sleeves 72 are locked in position in the apertures 70 by means of a set screw (not shown). A ball bearing 80 is seated in the aperture 78 through which a shaft 82 extends. The center of the shaft 82 coincides with the center 76 of the aperture 78. One or two driving or timing pulleys 84 are keyed by keys 86 to the one end portion 88 of the shaft 82. As will be described hereinafter, some shafts will have two driving or timing pulleys 84 and other shafts will have only one driving or timing pulley 84.

Figure 2:
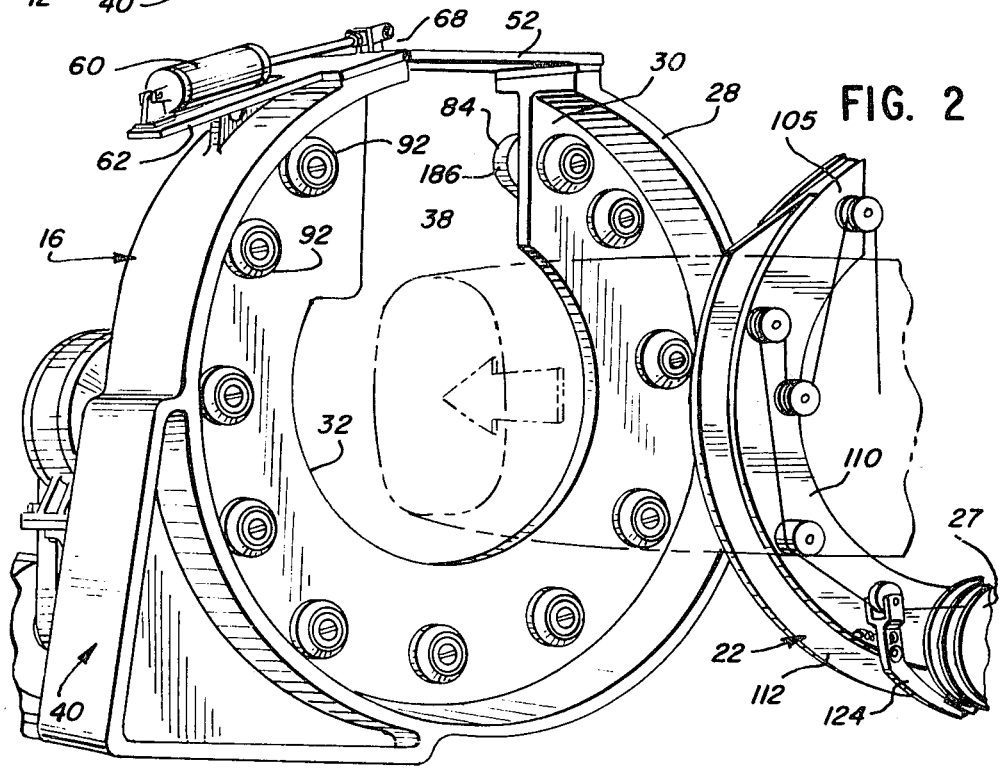
FIG. 2 is a slightly enlarged partial perspective view of the assembly of FIG. 1 with the shuttle exploded away from the support frame.

The opposite end portion 90 of the shaft 82 has a drive roller 92 keyed by a key 94 to the shaft 82 with a truncated V-shaped driving surface 95 formed of a ring of material 96 secured to the outer periphery of the drive roller 92, which material 96 may be rubber-like material so as to afford a relatively positive grip with a member in which it is in contact. A screw 98 is threaded into the end of the end portion 90 of the shaft 82 and has an enlarged head overlapping the drive roller 92 so as to prevent the roller from moving axially relative to the shaft 82. The screw 98 holds the roller 92 against a shoulder 100 on the shaft 82 and is prevented from working loose by means of a set screw 102 threaded through the head of the screw 98 and bearing against one face of the roller 92. As shown in FIG. 2, eleven drive rollers 92 are provided and project beyond the face of the web 30 on one side thereof with the driving or timing pulleys 84 projecting outwardly from the opposite side of the web 30 (see FIG. 5).

The shuttle 22 is circular in configuration and has walls 104 of a segment cut out of the body portion 105 thereof to provide an entrance opening or passage 106, which communicates with an article-receiving opening 108 defined by a wall 109 on the inner periphery of the shuttle 22. The size of the article-receiving opening 108 coincides with the article-receiving opening 32 in the support frame 16 and is substantially aligned therewith so that the geometric centers of the support frame 16 and of the shuttle 22 substantially coincide. The shuttle 22 (see FIG. 1) has the circular body portion 105 which has a hollow open portion 111 extending in from one axial face thereof and has a radially, outwardly extending flange 112 around a major peripheral portion thereof. On one side of the flange 112 and in the radially, outwardly facing surface 114 of the body 105 is a truncated V-shaped groove 115, which groove 115 has axially flared side walls 117 and a radially inwardly flared bottom wall 116 defining a mouth at a location where the groove 115 joins the walls 104 of the cutout segment. As viewed in FIGS. 1 and 8, the flared walls 116,117 of the groove 115 are on the counterclockwise side of the entrance opening or passage 106 in the shuttle 22.

The taper of the material of the truncated V-shaped driving surface 95 of the drive roller 92 is slightly larger than the taper of the V-shaped groove 115 in the shuttle 22 so that the material 96 of the driving surface 95 of the drive roller 92 will be depressed slightly as the roller 92 is engaged in the groove 115. The shuttle 22 is assembled with the support frame 16, with the driving surfaces 95 of all eleven drive rollers 92 nested in the groove 115, so that as the drive rollers 92 are rotated, they will drive the shuttle 22 in a clockwise direction. Each time the groove 115 of the shuttle 22 leaves the end roller 92 on the left-hand side of the entrance opening or passage 38 of the web 30, FIG. 2, it will traverse the entrance opening or passage 38 of the frame 16 with the flared walls 116,117 of the groove 115 engaging with the first drive roller 92 on the right side of the support frame 16. The flared walls 116,117 of the groove 115 permit minor misalignment of the groove 115 with the drive roller 92 as the shuttle 22 traverses the entrance opening or passage 38 so that it will contact the driving surface 95 of the roller 92 and will immediately re-engage the roller 92 in the groove 115 and continue to drive the shuttle 22.

Forming no part of the present invention, but having a bearing on the operation of the shuttle 22, is the structure carried by the body portion 105 of the shuttle 22. That is, the spool 27 carrying a supply of elongate material 26, such as cable or the like, is removably attached to a spindle 122, which spindle is freely rotatable on a shaft projecting transverse to the plane of the body portion 105 of the shuttle 22. The elongate material 26 passes over a tensioning mechanism 124 which urges a brake against a brake disc on the spindle 122 to apply a tension to the elongate material 26 as it is drawn from the spool 27. There are a plurality of tensioning members and roller members 126 carried by the shuttle 22 and over which the elongate material 26 passes from the spool 27, with the last member 126 guiding the elongate material 26 onto the toroidal body 24. The spool 27 and members 126 are carried by the shuttle 22 and rotate with the shuttle about the toroidal body 24 as the toroidal body is moved past the plane of the shuttle 22 so that the elongate material 26 is applied in a spiral fashion about the toroidal body 24.

The shuttle 22 has weights added thereto to dynamically balance the shuttle 22 to as ideal a condition as is possible. It should be apparent that the spool 27, when fully loaded with elongate material 26, will have a different balancing affect on the shuttle 22 than it will have when it is empty. It has been found preferable to balance the shuttle 22 when the spool 27 is empty so as to minimize the affect of the imbalance that will result as the supply of elongate material 26 is depleted and the wrap on the toroidal body 24 is completed, whereupon the shuttle rotation is stopped. If the imbalance is high at the time of stopping the shuttle 22, vibrations can develop that can cause excessive wear on some parts.

The motor and brake set 18, as shown in FIGS. 1, 4 and 5, is comprised of a prime mover 140, such as a motor, carried by the base 12 with the output of the motor driving a pulley 142 and being connected through a flexible coupling 144 to a dynamic magnetic stopping brake 146. A pillow block 148 carried by the base 12 has a bearing for supporting the output shaft 20 extending from the brake 146 and has a pulley 152 outboard of the pillow block 148, which pulley 152 is driven by the prime mover 140. A pillar 154 supports one end of a platform 156 upon which is mounted a running brake 158. The end of the platform 156, opposite the pillar 154, has a clevis connection 160 pivotally connected to one end of a belt tightener 162, the other end of which has a clevis connection 164 to a bracket 166 carried by the base 12. A belt 168 connects the pulley 142 on the output of the motor 140 to a pulley 170 carried by the shaft 172 of the running brake 158. The running brake 158 is tensioned by the belt tightener 162 to maintain a constant rotation of the shuttle 22. That is, the running brake 158 smooths out surges due to imbalance and tension variations in the drives. It should be understood that the system will operate with or without the running brake 158 but improved results can be obtained making use of the running brake 158.

The dynamic brake 146 is a standard article of manufacture which, in the present case, is a magnetic locking-type brake. The dynamic brake 146, when operated, will rapidly reduce the driving force to the output shaft 20 and to the shuttle 22 so as to affect relatively rapid stopping of the shuttle 22.

Referring particularly to FIGS. 5 and 6, each drive roller 92 has the shaft 82 projecting through the web 30 of the support frame 16. In the illustrated embodiment, this entails eleven shafts 82 projecting toward the reader as viewed in FIG. 5. Single driving or timing pulleys 84 are carried by seven of the eleven shafts 82 and these pulleys 84 are referred to as short drive roll assemblies 85. The remaining four shafts 82 have long drive roll assemblies 87 (FIG. 6), which entail two driving or timing pulleys 84 on the shafts 82. Four spindles 180 are mounted on the web 30 of the support frame 16 and have their axes lying parallel to the shafts 82 on the same side of the web 30 as the end portions 88 of the shafts 82 are located. Two large idler rollers 182 are mounted on two of the spindles 180 and two smaller idler rollers 184 are mounted on the remaining two spindles 180. The left-hand portion of the support frame 16, as viewed in FIG. 5, has an elongate belt 186 in contact with the pulleys 84 of four of the short drive roll assemblies 85, and in driving contact with the inner pulley 84 of one of the long drive roll assemblies 87. The belt 186 contacts one large idler roller 182 as the belt 186 extends between the two extreme pulleys.

On the right-hand portion of the support frame 16, as viewed in FIG. 5, a belt 188 passes around the pulleys 84 of three short drive roll assemblies 85 and about the inner pulley 84 of one long drive roll assembly 87. The belt 188 contacts one large idler roller 182. A short drive belt 190 contacts the outer pulley 84 of one long drive roll assembly 87 of the left-hand group of pulleys 84 and passes around the edge of short idler roller 184 and around the outer pulley 84 of a second long drive roll assembly 87. Said last-named second long drive roll assembly 87 has a belt 191 passing around the inner pulley 84 thereof, and around the small idler roller 184 and around the inner pulley 84 of the second long drive roll assembly 87. A driving belt 192 passes around the pulley 152 on the output shaft 20 from the motor 140 and passes around the outer pulley 84 of the long drive roll assembly 87 and around the outer pulley 84 of the long drive roll assembly 87 associated with the belt 188 and the right-hand group of short drive roll assemblies 85. In this way, the belt 192 is driven by the motor 140 to drive the two long drive roll assemblies 87 in contact with the drive belt 192, which two long drive roll assemblies 87, in turn, drive not only the belt 188 for rotating the drive roll assemblies 85 and 87 on the right-hand portion of the web 30, but also the belts 191,190 and 188 to drive the long and short drive roll assemblies 87,85, respectively, on the bottom and left-hand portions of the web 30. The drive belt 192 directly drives two rollers 92 and, through the belts 186, 188, 190 and 191, drives the remaining nine rollers 92. In this way, positive and uniform drive is provided for all eleven drive rollers 92 so that the shuttle 22 is rotatably driven by the eleven relatively closely spaced drive rollers 92 engaging in the groove 115 about the discontinuous outer periphery of the shuttle 22.

In FIG. 5, a modification of the shuttle drive is shown in phantom and includes a bifurcated bracket 200 mounted to the underside of the latching gate 52. The bracket 200 has a pivot 202 extending between the bifurcated arms with a roller 204 rotatably received on said pivot 202. The contact surface 206 of said roller resembles generally the shape and the material of the surfaces 95 of the rollers 92. The roller 204 is positioned and oriented in line with the rollers 92 on either side of the walls 104 of the cutout segment of the shuttle 22 and is adopted to engage in the groove 115 in the shuttle 22. The roller 204 will assist in stabilizing the shuttle 22 as it traverses the unsupported entrance opening 38 of the cutout segment of the frame 16 and aids in maintaining the balance of the shuttle 22 in that the weight of the shuttle is supported substantially throughout its periphery.

INDUSTRIAL APPLICABILITY

The motor and brake set 18, operating through the running brake 158, will afford a uniform drive to the eleven drive rollers 92 and shuttle 22 in a smooth and continuous fashion. The belt drive and the rollers 92 will permit the shuttle 22 to be driven at speeds, for example, of up to 300 revolutions per minute which is relatively high compared to previous gear-driven shuttle rotation systems. Upon completion of the winding or wrapping of the elongate material 26 on the toroidal body 24, a signal will be transmitted through the controls to deactivate the motor 140 which will activate the magnetic brake 146 to afford rapid deceleration and stopping of the shuttle 22 relative to the frame 16. The controls include an operative system for stopping the shuttle 22 with the walls 104 of the entrance opening 106 aligned with the walls 36 of the entrance opening or passage 38 in the support frame 16. When the shuttle 22 has stopped rotating, a signal to the controls will activate the actuator 60 to open the gate 52 to permit unloading of the wrapped toroidal body 24 and insertion of an unwrapped toroidal body through the entrance openings or passages 38 and 106 in the shuttle 22 and frame 16, respectively, into the article-receiving openings 32 and 108. Upon a command, the actuator 60 will close the latching gate 52 and after appropriate steps, not involved in the present application, are performed to attach the end of the elongate material 26 to the toroidal body 24, rotation of the shuttle 22 will be started by the motor 140 whereupon the toroidal body 24 will be wrapped as aforesaid.

To center the shuttle 22 relative to the support frame 16, each non-concentric bearing sleeve 72 can be released and rotated relative to the web 30 to reposition the center 76 of the shaft 82 which will reposition the contact surfaces 95 of the drive rollers 92. By shifting several of the drive rollers 92, the shuttle 22 can be very accurately aligned relative to the support frame 16 so that the center of the shuttle 22 coincides with the center of the drive frame. Each non-concentric bearing sleeve 72 will be resecured so that the shuttle 22 can be driven as desired.

The set screw 102 and attaching arrangement through the screw 98 for holding the drive roller 92 on the shaft 82 affords a readily accessible system for replacing worn drive rollers without requiring major disassembly of the machine. In practice, to replace a roller 92, the entrance opening 106 of the shuttle 22 is rotated to align said entrance opening 106 with the drive roller 92 that is to be replaced, whereupon the set screw 102 is removed and the screw 98 is backed out. The drive roller 92 is removed and a new drive roller 92 is assembled and locked to the shaft 82 by the key 94, screw 98 and set screw 102.

The assembly 10 is capable of fully automatic loading and unloading, and has a substantially fully automated wrap cycle. A driving and braking system is provided for quickly accelerating the shuttle 22 to operating speed whereupon it is driven with a uniform rate of rotation and whereupon it can be rapidly brought to stop upon command. The running brake 158 is provided to maintain a constant load on the shuttle drive motor. This is desirable to provide for out-of-balance conditions of the shuttle 22 due, first, to its open design and, second, to the change in loading on the shuttle caused by the discharge of the elongate material 26 from the spool 27 as the toroidal body 24 is wrapped. Without the running brake 158, the motor 140 would have tendency to drag or overspeed, depending upon the shuttle weight distribution. The brake 158 is electromagnetic and programmed to the imbalanced condition of the shuttle 22 throughout the wrap cycle. The open shuttle and open frame allows for the fully automatic loading and unloading cycles and the plurality of coated drive rollers 92 allows for high speed operations whereby vibration is minimized. The drive from the drive rollers 92 is positive and the coefficient of friction between the rollers 92 and the shuttle 22 is maximized for better control and for a more uniform rate of rotation. The running brake 158 is provided to reduce running and braking surges of the shuttle 22 during the wrapping cycle.

Other aspects, objects and advantages of this invention can be obtained from a study of the drawings, the disclosure and the appended claims.

We claim:

1. A shuttle drive assembly (10) having a base (12) and comprising:
   a support frame (16) carried by said base (12) and having an article-receiving opening (32) in the midportion therein, said support frame (16) having a cutout segment providing an access passage (38) into said article-receiving opening (32) therein,
   a shuttle (22) having an article-receiving opening (108) in the midportion thereof, said shuttle (22) having a cutout segment providing an access passage (106) into said article-receiving opening (108) therein, said opening (108) and passage (106) in said shuttle (22) being alignable with the opening (32) and passage (38) in said frame (16) for receiving a toroidal-shaped article (24) in said aligned openings (108,32) through the aligned access passages (38,106) in said frame (16) and said shuttle (22),
   means (85,87) for supporting and rotatably driving said shuttle (22), said means (85,87) including a drive roll assembly carried by said frame (16) and having drive rollers (92), mating means (115) for engaging with said drive rollers (82), said mating means being mounted on said shuttle (22) and disengaging from each of said drive rollers (82) during a portion of each full rotation of said shuttle (22),
   a motor (140), and
   motion transmission means (192, 191, 190, 186, 188) for connecting said drive roll assembly means (85,87) to said motor (140) for rotatably driving said shuttle (22) relative to said frame (16) in a plane substantially transverse to said toroidal-shaped article (24),
   said drive roll assembly means (85, 87) comprising a plurality of long drive roll assemblies (87) and a plurality of short drive roll assemblies (85), each long drive roll assembly (87) having two axially aligned pulleys (84,84) on one side of said frame (16) and a roller (92) on the other side of said frame (16).

2. A shuttle drive assembly (10) having a base (12) and comprising:
   a support frame (16) carried by said base (12) and having an article-receiving opening (32) in the midportion therein, said support frame (16) having a cutout segment providing an access passage (38) into said article-receiving opening (32) therein,
   a shuttle (22) having an article-receiving opening (108) in the midportion thereof, said shuttle (22) having a cutout segment providing an access passage (106) into said article-receiving opening (108) therein, said opening (108) and passage (106) in said shuttle (22) being alignable with the opening (32) and passage (38) in said frame (16) for receiving a toroidal-shaped article (24) in said aligned openings (108,32) through the aligned access passages (38, 106) in said frame (16) and said shuttle (22),
   means (85,87) for supporting and rotatably driving said shuttle (22), said means (85,87) including a drive roll assembly carried by said frame (16) and having drive rollers (82), mating means (115) for engaging with said drive rollers (82), said mating being mounted on said shuttle (22) and disengaging from each of said drive rollers (82) during a portion of each full rotation of said shuttle (22),
   a motor (140), and
   motion transmission means (192, 191, 190, 186, 188) for connecting said drive roll assembly means (85, 87) to said motor (140) for rotatably driving said shuttle (22) relative to said frame (16) in a plane substantially transverse to said toroidal-shaped article (24),
   said drive roll assembly means (85,87) comprising a plurality of long drive roll assemblies (87) and a plurality of short drive roll assemblies (85), each short drive roll assembly (85) having one pulley (84) on one side of the frame (16) and a roller (92) on the other side of said frame (16).

3. A shuttle drive assembly as claimed in claim 1 wherein said mating means (115) on said shuttle (22) is a radially open groove (115), and wherein said rollers (92) on said long drive roll assemblies (87) engage in said groove (115) in said shuttle (22) for driving and for stopping rotation of said shuttle (22) upon rotation and stopping of said long and short drive roll assemblies (87,85).

4. A shuttle drive assembly as claimed in claim 2 wherein said mating means (115) on said shuttle (22) is a radially open groove (115), and wherein said rollers

(92) on said short drive roll assemblies (75) engage in said groove (115) in said shuttle (22) for driving and for stopping rotation of said shuttle (22) upon rotation and stopping of said long and short drive roll assemblies (87,85).

5. A shuttle drive assembly as claimed in claim 3 wherein said groove (115) in the shuttle (22) has a flared open entrance (116,117) on the leading edge portion of the groove (115) so as to guide the respective rollers (92) into the groove (115) during re-engagement.

6. A shuttle drive assembly as claimed in claim 4 wherein said groove (115) in the shuttle (22) has a flared open entrance (116,117) on the leading edge portion of the groove (115) so as to guide the respective rollers (92) into the groove (115) during re-engagement.

7. A shuttle drive assembly as claimed in claim 5 wherein said motion transmission means (192,191,190,186,188) operatively connecting said motor means (140) with said drive roll means (85,87) comprises drive belts (192,191,190,186,188) which selectively encircle a pulley (152) on the output shaft (20) and the pulleys (84) on the long drive roll assemblies (87).

8. A shuttle drive assembly as claimed in claim 6 wherein said motion transmission means (192,191,190,186,188) operatively connecting said motor means (140) with said drive roll means (85,87) comprises drive belts (192,191,190,186,188) which selectively encircle a pulley (152) on the output shaft (20) and the pulleys (84) on the short drive roll assemblies (85).

9. In a shuttle drive assembly (10) having a base (12), a support frame (16) carried by the base (12) and having a first article-receiving opening (32) in the midportion thereof, said support frame (16) has an entrance passage (38) opening into said first article-receiving opening (32) therein, and motor means (140) for rotatably driving said shuttle, said motor means (14) for rotatably driving said shuttle, said motor means being mounted on said base (12) in combination:
 a shuttle (22) having a circular body portion (105) with a second article-receiving opening (108) in the midportion thereof, said shuttle (22) having an entrance passage (106) opening into said second article-receiving opening (108) therein, said second article-receiving opening (108) in the shuttle (22) being alignable with said first article-receiving opening (32) in the frame (16) for receiving a toroidal-shaped article (24) through the aligned entrance passages (38,106) in the frame (16) and in the shuttle (22) and for positioning said toroidal-shaped article (24) in the first and second article-receiving openings (32, 108) in said frame (16) and shuttle (22), and for positioning said toroidal-shaped article (24) in the aligned first and second article-receiving openings (32, 108) in said frame (16) and shuttle (22),
 a C-shaped track (115) on said shuttle (22) having an entrance passage aligned with said shuttle entrances passage (106),
 drive roll means (85,87) for supporting and rotatably driving said shuttle (22), said drive roller means (85,87) being carried by the frame (16) and including rollers (92) engaging with and supporting said track (115), and
 means (192, 191, 190, 188, 186) for operatively connecting said motor means (140) with said drive roll means (85,87) for rotatably driving said shuttle (22) relative to said frame (16) in a plane transverse to a mid-circumferential plane of said toroidal-shaped article (24),
 said drive roll assembly means (85, 87) comprising a plurality of long drive roll assemblies (87) and a plurality of short drive roll assemblies (85).

10. A shuttle drive assembly as claimed in claim 9 wherein each long drive roll assembly (87) has a roller (92) on the side of said frame (16) adjacent said shuttle (22) and two axially aligned pulleys (84,84) on the other side of said frame (16).

11. A shuttle drive assembly as claimed in claim 9 wherein each short drive roll assembly (85) has a roller (29) on the side of said frame (16) adjacent said shuttle (22) and one pulley (84) on the other side of said frame (16).

12. A shuttle drive assembly as claimed in claim 10 wherein said track (115) on said shuttle (22) includes a radially open groove (115), and wherein said rollers (92) on said long drive roll assemblies (87) engage in said groove (115) in said shuttle (22) for driving and for stopping rotation of said shuttle (22) upon rotation or stopping of said long drive roll assemblies (87).

13. A shuttle drive assembly as claimed in claim 11 wherein said track (115) on said shuttle (22) includes a radially open groove (115), and wherein said rollers (92) on said short drive roll assemblie (85) engage in said groove (115) in said shuttle (22) for driving and for stopping rotation of said shuttle (22) upon rotation or stopping of said short drive roll assemblies (85).

14. A shuttle drive assembly as claimed in claim 12 wherein said groove (115) in the shuttle (22) has a flared open entrance (116,117) on the leading edge portion of the groove (115) so as to guide the respective rollers (92) into the groove (115) during re-engagement.

15. A shuttle drive assembly as claimed in claim 13 wherein said groove (115) in the shuttle (22) has a flared open entrance (116,117) on the leading edge portion of the groove (115) so as to guide the respective rollers (92) into the groove (115) during re-engagement.

16. A shuttle drive assembly as claimed in claim 14 wherein said means (192,191,190,186,188) operatively connecting said motor means (140) with said drive roll means (87,85) comprises drive belts (192,191,190,186,188) which selectively encircle a pulley (152) on the output shaft (20) and the pulleys (84) on the long drive roll assemblies (87).

17. A shuttle drive assembly as claimed in claim 15 wherein said means (192,191,190,186,188) operatively connecting said motor means (140) with said drive roll means (87,85) comprises drive belts (192,191,190,186,188) which selectively encircle a pulley (152) on the output shaft (20) and the pulleys (84) on the short drive roll assemblies (85).

* * * * *